United States Patent
Li et al.

(10) Patent No.: US 7,215,530 B2
(45) Date of Patent: May 8, 2007

(54) HIGH ESR LOW ESL CAPACITOR

(75) Inventors: Yuan-Liang Li, Chandler, AZ (US);
David G. Figueroa, Tolleson, AZ (US);
Nicholas L. Holmberg, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/174,063

(22) Filed: Jun. 30, 2005

(65) Prior Publication Data
US 2007/0002519 A1    Jan. 4, 2007

(51) Int. Cl.
*H01G 4/005* (2006.01)
*H01G 4/228* (2006.01)

(52) U.S. Cl. .......... 361/303; 361/309; 29/25.42

(58) Field of Classification Search ........ 361/303–305, 361/306.1, 306.2, 306.3, 311; 29/25.42
See application file for complete search history.

(56) References Cited
U.S. PATENT DOCUMENTS

| | | | | |
|---|---|---|---|---|
| 4,513,350 A | * | 4/1985 | Coleman | 361/321.2 |
| 4,729,058 A | * | 3/1988 | Gupta et al. | 361/321.3 |
| 5,742,473 A | * | 4/1998 | Sano et al. | 361/321.4 |
| 5,835,338 A | * | 11/1998 | Suzuki et al. | 361/301.4 |
| 6,052,272 A | * | 4/2000 | Kuroda et al. | 361/303 |
| 6,760,215 B2 | * | 7/2004 | Devoe | 361/303 |
| 6,900,991 B2 | * | 5/2005 | Patel et al. | 361/782 |

FOREIGN PATENT DOCUMENTS

| JP | 01220422 A | * | 9/1989 |
|---|---|---|---|
| JP | 07263269 A | * | 10/1995 |

OTHER PUBLICATIONS

Certified translation of JP 07263269.*

* cited by examiner

*Primary Examiner*—Eric W. Thomas
(74) *Attorney, Agent, or Firm*—Robert D. Anderson

(57) ABSTRACT

In some embodiments, a capacitor includes a first conductive layer electrically coupled to a first terminal, a second conductive layer electrically coupled to a second terminal, a floated conductive layer disposed between the first and second conductive layers, and a plurality of non-conductive layers respectively disposed between each of the conductive layers. Other embodiments are disclosed and claimed.

22 Claims, 6 Drawing Sheets

HIGH ESR LOW ESL CAPACITOR

The invention relates to capacitors.

BACKGROUND AND RELATED ART

Electronic devices typically include a variety of common circuit components, including passive components such as resistors, inductors, and capacitors, as well as active components such as transistors and integrated circuits. Passive components such as inductors or capacitors are designed to store energy, and resistors are designed to resist the flow of applied current to a specified degree. Most capacitors comprise conductive plates separated by an insulator and are configured to provide a specified opposition to change in voltage across the plates.

In practical applications, passive components may not have only those desired electrical characteristics described above. For example, a capacitor may exhibit some amount of effective inductance and resistance. Although it is difficult to measure the resistance or inductance present across a capacitor because it includes a nonconductive layer, various methods of measuring and calculating an equivalent series inductance (ESL) and an equivalent series resistance (ESR) of a capacitor have been developed and are useful in characterizing capacitors. Equivalent series inductance is also sometimes called parasitic inductance, indicating that although it is present it is not generally desired.

In conventional capacitors, it is difficult to provide both high equivalent series resistance (ESR) and low equivalent series inductance (ESL).

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the invention.

DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well known devices, circuits, and methods are omitted so as not to obscure the description of the present invention with unnecessary detail.

Figure 1:
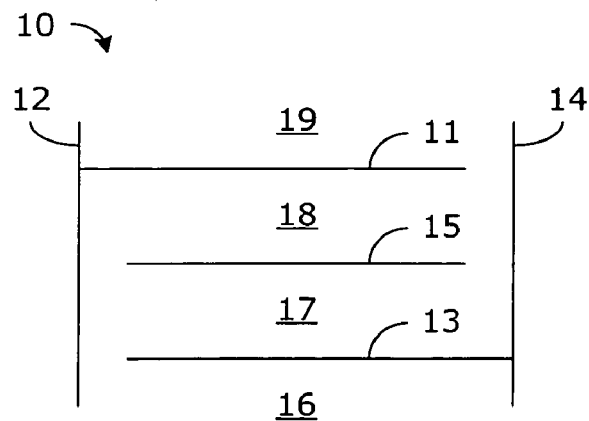
FIG. 1 is a diagram of a capacitor according to some embodiments of the invention.

With reference to FIG. 1, a capacitor 10 includes a first conductive layer 11 electrically coupled to a first terminal 12, a second conductive layer 13 electrically coupled to a second terminal 14, a floated conductive layer 15 disposed between the first and second conductive layers 11 and 13, and a plurality of non-conductive layers (e.g. layers 17 and 18) respectively disposed between each of the conductive layers (e.g. layers 11, 13, and 15). In some embodiments of the invention, the capacitor 10 may exhibit a relatively high equivalent series resistance, and the capacitor 10 may further include a relatively thin layer non-conductive layer (e.g. layers 16 and 19) disposed on each outermost side of each outermost conductive layers (e.g. layers 11 and 13). Advantageously, the capacitor 10 may exhibit a relatively low equivalent series inductance.

Figure 2:
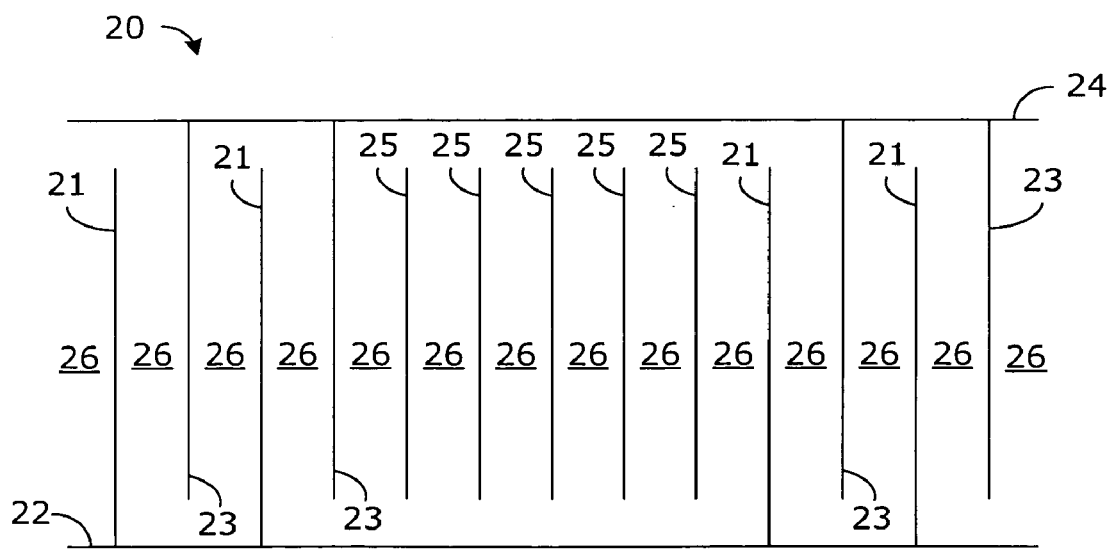
FIG. 2 is a diagram of another capacitor according to some embodiments of the invention.

With reference to FIG. 2, a capacitor 20 includes a first plurality of conductive layers 21, with each layer 21 electrically coupled to a first terminal 22. The capacitor 20 includes a second plurality of conductive layers 23, with each layer 23 electrically coupled to a second terminal 24. The layers 21 may be interleaved with the layers 23. A plurality of floated conductive layers 25 may be disposed between any of the first and second layers 21 and 23. In some embodiments, as shown in FIG. 2, all of the floated layers 25 may be consecutively disposed between two interleaved groups of the first and second plurality of conductive layers 21 and 23. Non-conductive layers 26 may be respectively disposed between each of the conductive layers 21, 23, and 25. Additional relatively thin non-conductive layers 26 may be disposed on the outermost sides of the outermost conductive layers.

For example, the conductive layers 21, 23, and 25 may be made from metal material and the non-conductive layers 26 may be made from dielectric material. For example, the dielectric material may include ceramic material. Advantageously, appropriately configured the capacitor 20 may exhibit both high ESR and low ESL.

Figure 3:
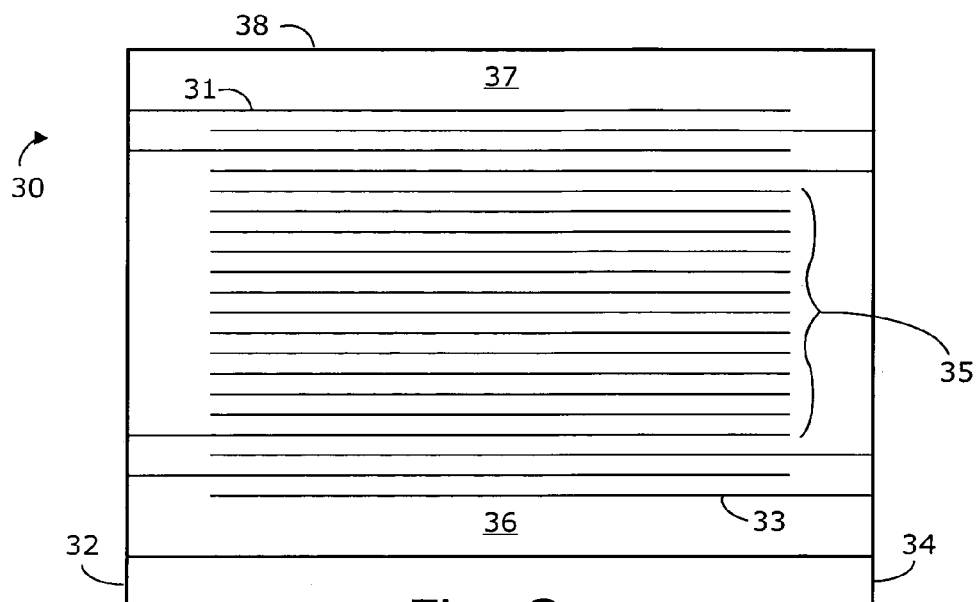
FIG. 3 is a schematic, cross sectional representation of another capacitor according to some embodiments of the invention.
Figure 4:
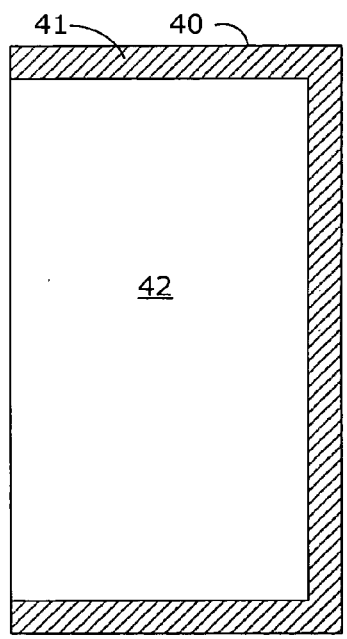
FIG. 4 is a top, plan view of one portion of a two terminal multi-layer capacitor according to some embodiments of the invention.
Figure 5:
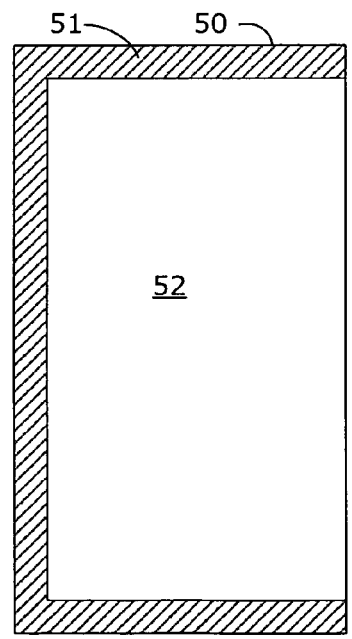
FIG. 5 is a top, plan view of another portion of a multi-layer capacitor according to some embodiments of the invention.
Figure 6:
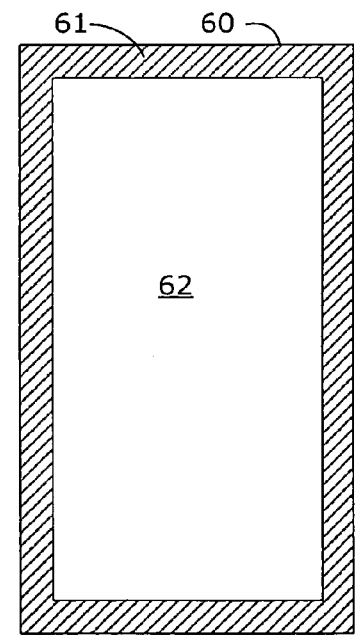
FIG. 6 is a top, plan view of another portion of a two terminal multi-layer capacitor according to some embodiments of the invention.

With reference to FIG. 3, a capacitor 30 includes a first plurality of conductive layers 31, with each layer 31 electrically coupled to a first terminal 32. The capacitor 30 includes a second plurality of conductive layers 33, with each layer 33 electrically coupled to a second terminal 34. The layers 31 may be interleaved with the layers 33. A plurality of floated conductive layers 35 may be disposed between any of the first and second layers 31 and 33. In some embodiments, as shown in FIG. 3, all of the floated layers 35 may be consecutively disposed between two interleaved groups of the first and second plurality of conductive layers 31 and 33. Non-conductive layers may be respectively disposed between each of the conductive layers 31, 33, and 35). Additional relatively thin non-conductive layers 36 and 37 may be disposed on the outermost sides of the outermost conductive layers.

The conductive layers and the non-conductive layers of the capacitor 30 may be positioned inside a housing or package 38, with the terminals 32 and 34 providing external connections for the capacitor 30. In some embodiments, one or more outer non-conductive layers (e.g. ceramic material) may provide the housing/package 38. The terminals 32 and 34 are not necessarily leads, and may comprise plated terminations on the outside of the housing/package 38. Some embodiments of the invention may provide discrete capacitor components. Some embodiments of the invention may be provided on an integrated circuit. Some embodiments of the invention may be included in a package with an integrated circuit die.

While not limited to theory of operation, some embodiments of the invention may float dummy metal layers in a capacitor to achieve high equivalent series resistance (ESR). For example, some conventional high ESR capacitors may include relatively thick outermost dielectric layers, which may increase the ESL of the capacitor. If the ESL becomes too high, the potential applications for the capacitor may be limited. Advantageously, in some embodiments of the invention, the floated internal metal layers may increase ESR while reducing or maintaining the ESL of the capacitor.

For example, the capacitor 30 may utilize disconnected central metal layers while keeping the external terminals 32 and 34, thereby providing a high ESR and while keeping ESL low. In general, the ESR value depends on the overall number of internal conductive layers. The arrangement of conductive layers 31 and 33 may be selected for a desired capacitance value, while the number of floated layers 35 may be selected in accordance with a desired value for the ESR. The outermost non-conductive portions 36 and 37 may be thinner as compared to the outermost non-conductive portions of a conventional capacitor with the same ESR. The thinner non-conductive portions 36 and 37 may provide a lower ESL.

For example, reducing the ESL of a high ESR capacitor may help a power delivery system to meet the high performance requirement for high speed busses. Some embodiments of the invention may be provided for die/package and/or package/motherboard power supply noise damping. A high ESR/low ESL capacitor may be necessary or useful for high-speed input/output applications. Advantageously, a high-speed I/O application utilizing capacitors in accordance with some embodiments of the invention may avoid increasing the on-die capacitance and consequent cost increase (e.g. for associated processors and/or chipsets).

With reference to FIGS. 4–8, one portion 40 of a multi-layer capacitor 70 includes a conductive layer 42 stacked on a non-conductive layer 41. An edge of the conductive layer 42 is aligned with an edge of the non-conductive layer 41, such that an electrical connection may be made between the conductive layer 42 and a first terminal 72. Another portion 50 of a multi-layer capacitor 70 includes a conductive layer 52 stacked on a non-conductive layer 51. An edge of the conductive layer 52 is aligned with an edge of the non-conductive layer 51, such that an electrical connection may be made between the conductive layer 52 and a second terminal 74.

Another portion 60 of the multi-layer capacitor 70 includes a conductive layer 62 stacked on a non-conductive layer 61. A clearance is provided between any edge of the conductive layer 62 and both the first and second terminal 72 and 74, such that the conductive layer 62 may be considered to be disconnected or floated with respect to the external connections to the capacitor 70. As illustrated, clearance is provided between all edges of the conductive layer 62 and the non-conductive layer 61 and the conductive area on the floated conductive aver 62 is disposed completely within an area defined by the overlap of the conductive areas on the first and second conductive layers 42 and 52.

Figure 7:
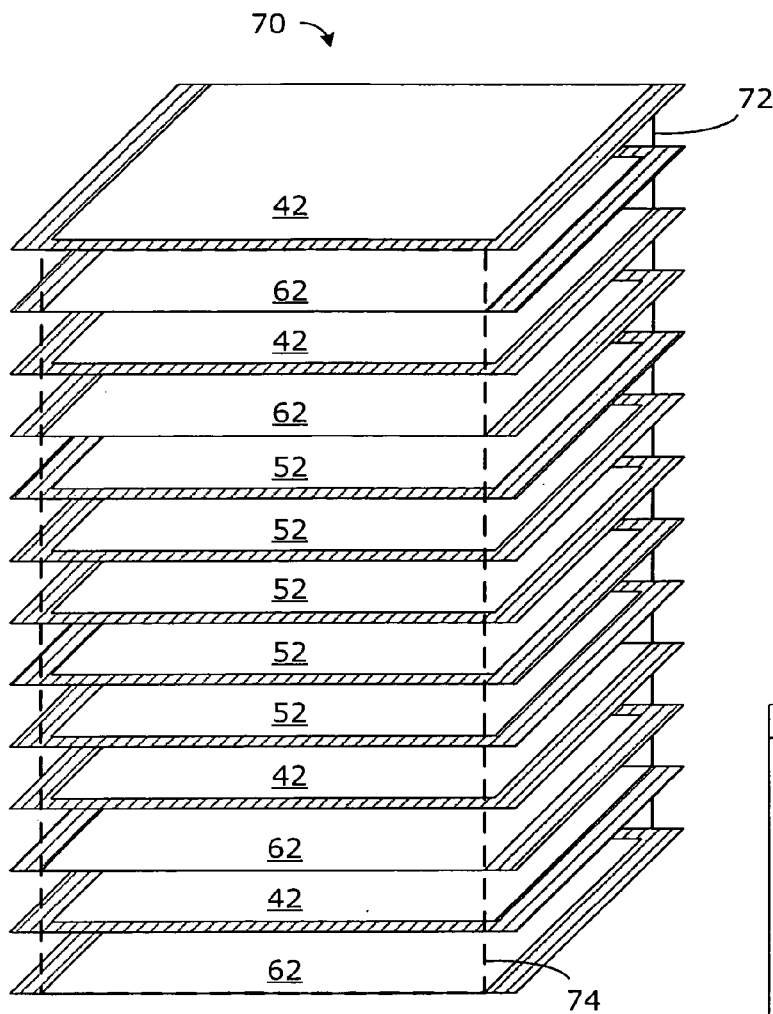
FIG. 7 is an exploded, perspective view of a two terminal multi-layer capacitor according to some embodiments of the invention.

As shown in FIG. 7, the various portions 40, 50, and 60 may be stacked to form the multi-layer capacitor 70. The conductive layers 42 may be interleaved with the conductive layers 52. A plurality of floated conductive layers 62 may be disposed between the interleaved conductive layers 42 and 52. The non-conductive layers 41, 51, and 61 respectively separate the adjacent conductive layers. In some embodiments, one or more additional non-conductive layers may be provided above and/or below the outermost portions.

The first set of layers 42 may be adapted to be connected to the first terminal 72. In some applications, the first terminal 72 may be considered a negative terminal which is generally connected to ground. The second set of layers 52 may be adapted to be connected to the second terminal 74. In some application, the second terminal 74 may be considered a positive terminal which is generally connected to a positive voltage signal.

While shown with thirteen overall conductive layers 42, 52, and 62, it will be understood that the number of layers may be greater than thirteen in some embodiments. In other embodiments, the number of layers may be less than thirteen. Capacitance may be determined by the surface area of the conductive layers 42 and 52 and the distance between the layers. Generally the greater the surface area, smaller the distance between the plates and/or greater the dielectric constant, the greater the capacitance.

The conductive layers 42, 52, and 62 and terminals 72 and 74 may be made of any suitable conductive material. In some embodiments, the conductive layers and terminals may be made of a metal such as silver (Ag), Copper (Cu), nickel (Ni), palladium (Pd), tin (Sn), aluminum (Al), platinum (Pt), or gold (Au), or alloys or combinations of these metals, such as palladium/silver (Pd/Ag). In other embodiments, other metals not listed and their combinations or alloys can be used. The same or different materials may be used for each conductive layer. The thickness of the various conductive may be the same or may vary.

The non-conductive layers 41, 51, and 61 may be made of any suitable non-conductive material. In some embodiments, the conductive layers may be made of a ceramic. In other embodiments, other dielectric materials or combinations of such materials may be used. The same or different materials may be used for each non-conductive layer. The thickness of the various non-conductive layers may be the same or may vary. Various techniques are well known for stacking or depositing metal material on ceramic material.

Multi-layer capacitors may be used in many different types of applications, from power delivery for computer motherboards and packages to automotive applications. Multi-Layer Ceramic Capacitors (MLCCs) are a widely-used type of multi-layer capacitor that include several layers of a ceramic dielectric material separated from each other by layers of a conductive material. Some embodiments of the invention may be constructed as high ESR, low ESL MLCCs.

Figure 8:
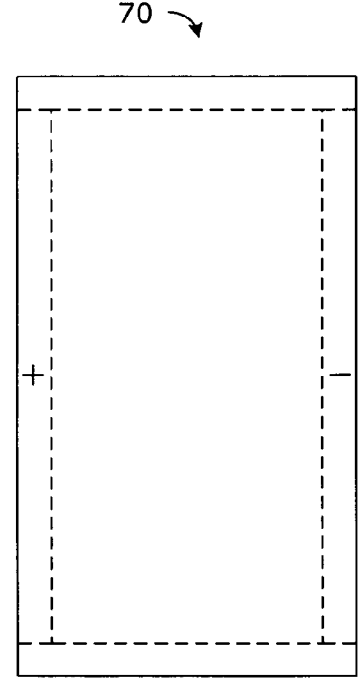
FIG. 8 is a top, plan view of the multi-layer capacitor from FIG. 7.

As shown in FIG. 8, the multi-layer capacitor 70 provides a two terminal capacitor having a positive terminal (+) on one side and a negative terminal (−) on the other side. For example, plated terminations may provide external connections to the capacitor. The packaging of the multi-layer capacitor 70 may include through hole, surface mount, and other configurations. In some embodiments, the stack of conductive and non-conductive materials may be sufficiently flexible to allow the capacitor structure to be rolled into a tube shape and housed in a cylindrical housing (in which case wire or leads may be attached to the terminals to provide an external connection).

Figure 9:
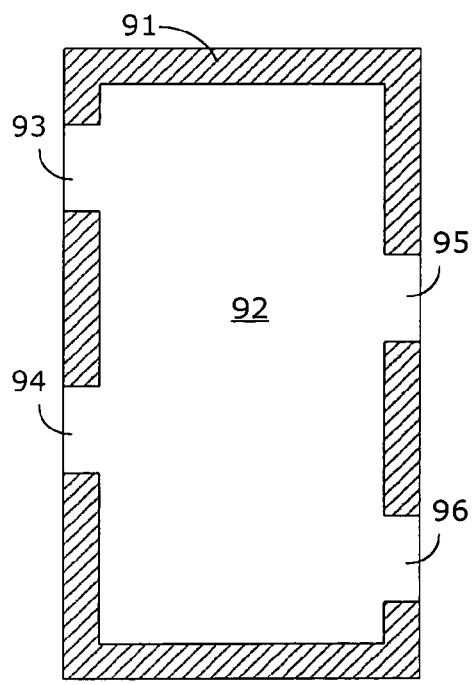
FIG. 9 is a top, plan view of one portion of an eight terminal multi-layer capacitor according to some embodiments of the invention.
Figure 10:
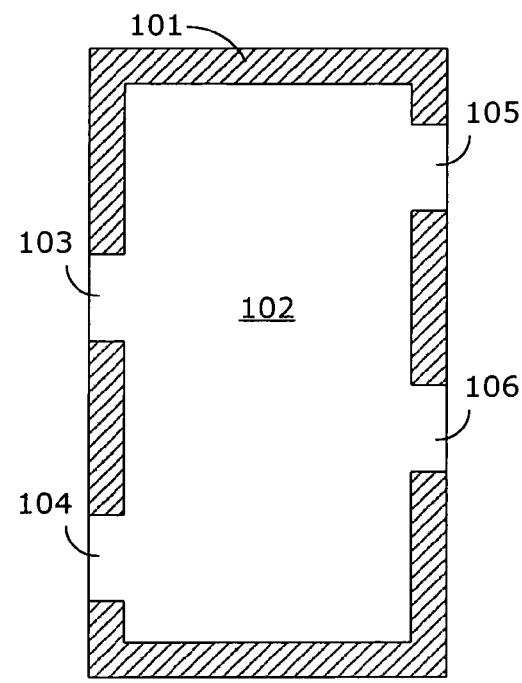
FIG. 10 is a top, plan view of another portion of an eight terminal multi-layer capacitor according to some embodiments of the invention.
Figure 11:
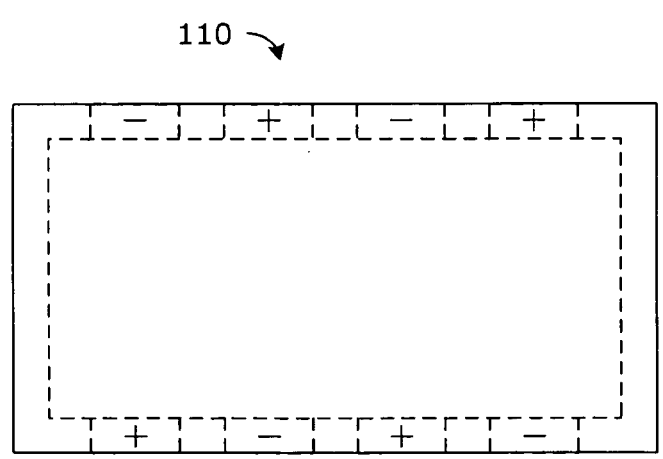
FIG. 11 is a top, plan view of an eight terminal multi-layer capacitor according to some embodiments of the invention.

With reference to FIGS. 9–11, an eight terminal multi-layer capacitor 110 includes a first set of conductive layers 92 with each layer 92 having four tabs 93, 94, 95, and 96 adapted to be electrically connected to a first set of four positive terminals (+). The eight terminal multi-layer capacitor 110 includes a second set of conductive layers 102 with each layer 102 having four tabs 103, 104, 105, and 106 adapted to be electrically connected to a second set of four negative terminals (−). The eight terminal multi-layer capacitor 110 includes one or more floated conductive layers (e.g. layer 62) disposed between the first and second sets of conductive layers 92 and 102. Non-conductive layers (e.g. layers 91, 101, and 61) are disposed between adjacent conductive layers. In the illustrated examples, the positive and negative terminals alternate on opposite sides of the capacitor 110. Of course, other arrangements of the terminals are within the scope of various embodiments of the invention. Other construction details are similar to the capacitor 70.

Figure 12:
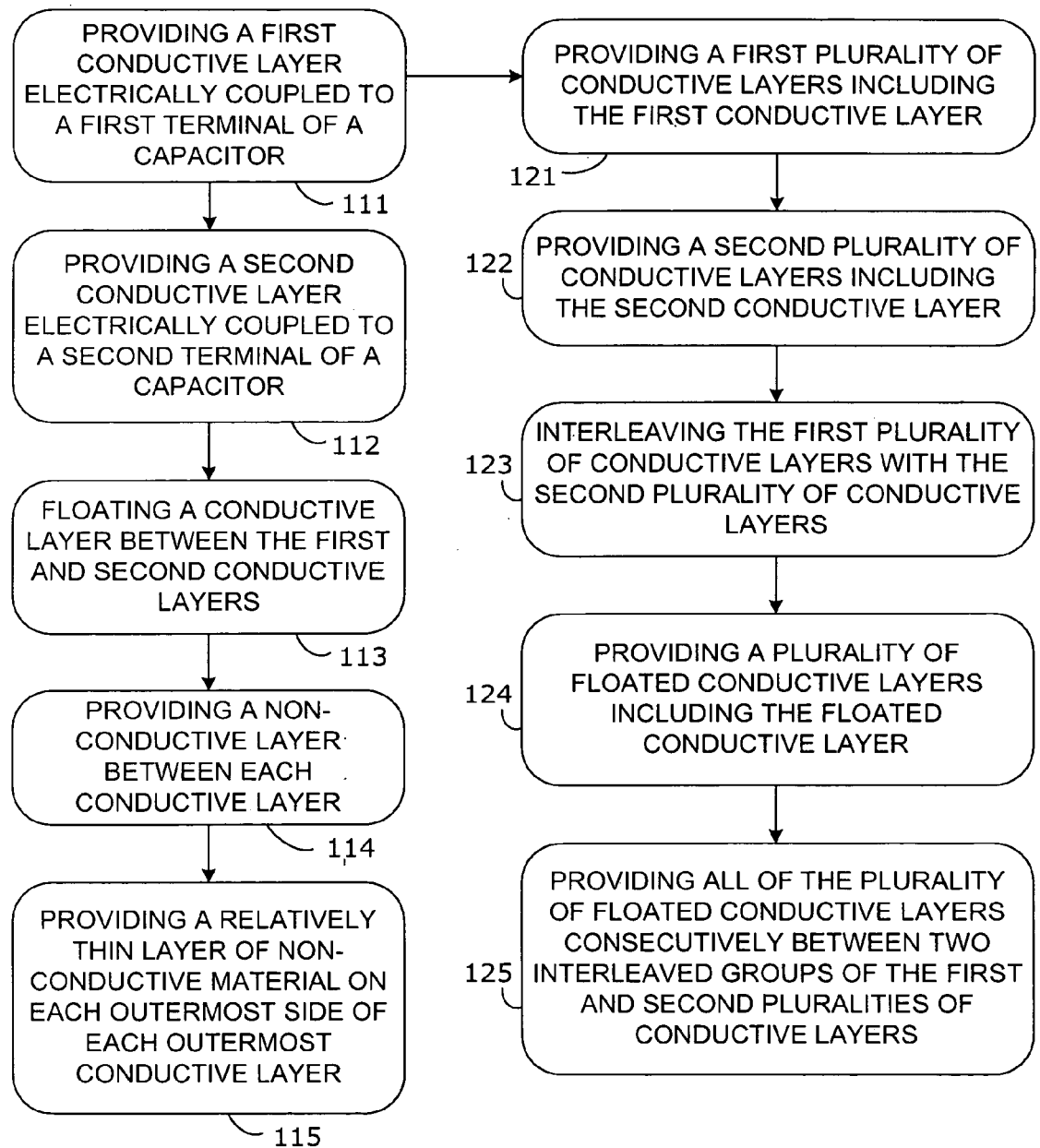
FIG. 12 is a flow diagram according to some embodiments of the invention.

FIG. 12 is a flow diagram of a method according to some embodiments. The method may be executed by various combinations of hardware, software and/or firmware, and some or all of the method may be performed manually. Portions of the method may be performed by different entities. For example, the method may be performed by any combination of an integrated circuit manufacturer, a capacitor manufacturer, and a system integrator. Some embodiments of the invention may involve providing a first conductive layer electrically coupled to a first terminal of a capacitor (e.g. at 111), providing a second conductive layer electrically coupled to a second terminal of a capacitor (e.g. at 112), floating a conductive layer between the first and second conductive layers (e.g. at 113), and providing a non-conductive layer between each conductive layer (e.g. at 114). Those skilled in the art will appreciate that the foregoing is not a detailed beginning-to-end process flow for manufacturing capacitor, and that the description of various conventional manufacturing techniques as been omitted so as to not obscure the invention with unnecessary detail.

For example, the capacitor may exhibit a relatively high equivalent series resistance, and some embodiments of the invention may further involve providing a relatively thin layer of non-conductive material on each outermost side of each outermost conductive layer (e.g. at 115). For example, the capacitor may exhibit a relatively low equivalent series inductance.

Some embodiments of the invention may further involve providing a first plurality of conductive layers including the first conductive layer (e.g. at 121), providing a second plurality of conductive layers including the second conductive layer (e.g. at 122), and interleaving the first plurality of conductive layers with the second plurality of conductive layers (e.g. at 123). Some embodiments may further involve providing a plurality of floated conductive layers including the floated conductive layer (e.g. at 124). Some embodiments may further involve providing all of the plurality of floated conductive layers consecutively between two interleaved groups of the first and second pluralities of conductive layers (e.g. at 125). For example, the conductive layers may include metal material and the non-conductive layers may include dielectric material. For example, the dielectric material may include ceramic material.

Figure 13:
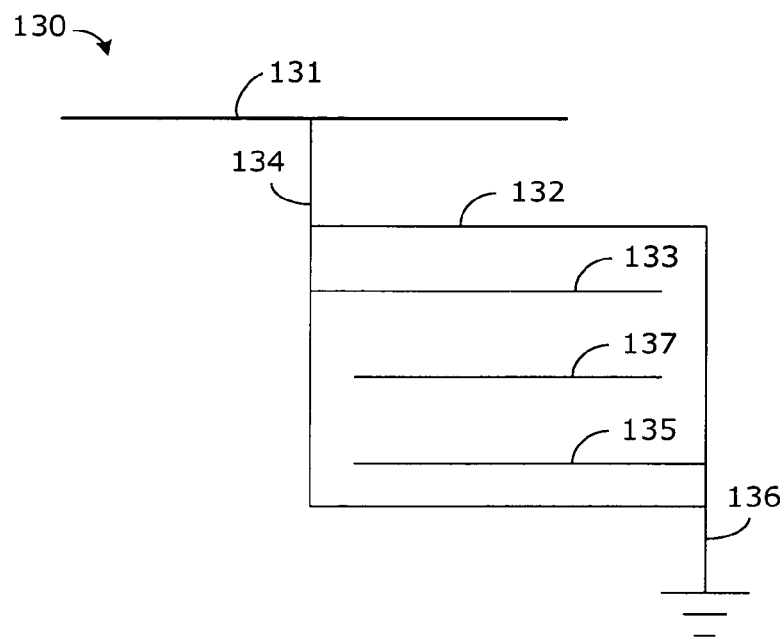
FIG. 13 is a diagram of a system according to some embodiments of the invention.

With reference to FIG. 13, a system 130 includes a conductive signal line 131 and a capacitor 132 coupled to the conductive signal line 131, wherein the capacitor includes a first conductive layer 133 electrically coupled to a first terminal 134, a second conductive layer 135 electrically coupled to a second terminal 136, and a floated conductive layer 137 disposed between the first and second conductive layers 133 and 135, and a plurality of non-conductive layers respectively disposed between each of the conductive layers. For example, the capacitor may exhibit a relatively high equivalent series resistance, and the capacitor may further include a relatively thin layer of non-conductive material disposed on each outermost side of each outermost conductive layer. For example, the capacitor may exhibit a relatively low equivalent series inductance.

In some embodiments of the system 130, the first conductive layer 133 may be one layer of a first plurality of conductive layers, the second conductive layer 135 may be one layer of a second plurality of conductive layers, the first plurality of conductive layers is interleaved with the second plurality of conductive layers. Likewise, the floated conductive layer may be one layer of a plurality of floated conductive layers. In some embodiments, all of the plurality of floated conductive layers are consecutively disposed between two interleaved groups of the first and second pluralities of conductive layers. For example, the conductive layers may include metal material and the non-conductive layers may include dielectric material. For example, the dielectric material may include ceramic material. Some embodiments of the system 130 may further include a processor coupled to the signal line.

Figure 14:
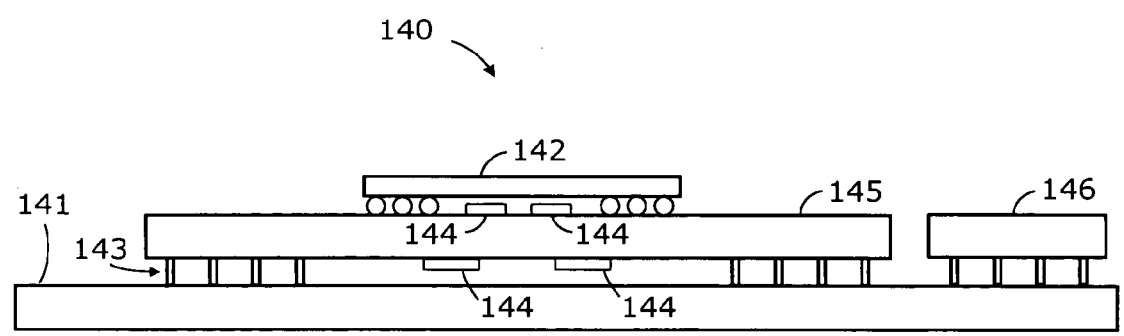
FIG. 14 is a diagram of another system according to some embodiments of the invention.

With reference to FIG. 14, a system 140 includes integrated circuit die 142, integrated circuit package 145, motherboard 141 and memory 146. Integrated circuit die 142 may be fabricated using any suitable substrate material and fabrication technique and may provide any functions to system 140. In some embodiments, integrated circuit die 142 is a microprocessor die having a silicon substrate.

Integrated circuit package 145 may comprise any ceramic, organic, and/or other suitable material. Package 145 may be electrically coupled to circuit elements of die 142 by Controlled Collapse Chip Connect (C4) solder bumps. In some embodiments, integrated circuit package 145 may be electrically coupled to circuit elements of die 142 via wirebonds.

Decoupling capacitors 144 are coupled to integrated circuit package 145 (e.g. via a signal line). Capacitors 144 may comprise surface-mount capacitors for mounting to conductive contacts of circuit boards and/or integrated circuit packages. Positive and negative terminals of each of capacitors 144 are coupled to respective conductive contacts of integrated circuit package 145. According to some embodiments, the conductive contacts are coupled in turn to a power delivery circuit of package 145. Some embodiments of the foregoing may reduce resonance between package 145 and motherboard 141 more effectively and/or more efficiently than conventional systems. One or more of capacitors 144 may be substituted with one or more capacitors structured similarly to above-described capacitors 10, 20, 30, 70 or 110, or other embodiments of the present invention.

Pins 143 couple package 145 to motherboard 141. Pins 143 may carry power and other electrical signals between motherboard 141 and die 142. In some embodiments, pins 143 interface with a socket (not shown) of motherboard 141. According to some embodiments, integrated circuit package 145 is a surface-mountable substrate such as an Organic Land Grid Array substrate that may be mounted directly on motherboard 141 or mounted on a pinned interposer which mates with a socket of motherboard 141. Packaging systems other than those mentioned above may be used in conjunction with some embodiments, including systems which do not utilize pins such as ball grid array (BGA) and land grid array (LGA).

Motherboard 141 may comprise a memory bus (not shown) coupled to pins 143 and to memory 146. In operation, motherboard 141 may route input/output and power signals to pins 143 for transmission to integrated circuit die 142 through integrated circuit package 145. Memory 146 may comprise any type of memory for storing data, such as a single data rate random access memory, a double data rate random access memory, or a programmable read only memory.

The foregoing and other aspects of the invention are achieved individually and in combination. The invention should not be construed as requiring two or more of such aspects unless expressly required by a particular claim. Moreover, while the invention has been described in connection with what is presently considered to be the preferred examples, it is to be understood that the invention is not limited to the disclosed examples, but on the contrary, is intended to cover various modifications and equivalent arrangements included within the spirit and the scope of the invention.

What is claimed is:

1. A capacitor, comprising:
   a first conductive layer having a first conductive area electrically coupled to a first terminal;
   a second conductive layer having a second conductive area electrically coupled to a second terminal;
   a floated conductive layer having a floated conductive area disposed between the first and second conductive layers; and
   a plurality of non-conductive layers respectively disposed between each of the conductive layers,
   wherein the floated conductive area is completely disposed within an area defined by an overlap of the first and second conductive areas,
   wherein the floated conductive area is configured to provide the capacitor with a relatively high equivalent series resistance, the capacitor further comprising:
   a relatively thin layer of non-conductive material disposed on each outermost side of each outermost conductive layer.

2. The capacitor of claim 1, wherein the relatively thin layer of non-conductive material disposed on each outermost side of each outermost conductive layer is sufficiently thin to provide the capacitor with a relatively low equivalent series inductance.

3. The capacitor of claim 1, wherein:
   the first conductive layer is one layer of a first plurality of conductive layers,
   the second conductive layer is one layer of a second plurality of conductive layers, and
   the first plurality of conductive layers is interleaved with the second plurality of conductive layers.

4. The capacitor of claim 3, wherein the floated conductive layer is one layer of a plurality of floated conductive layers.

5. The capacitor of claim 4, wherein all of the plurality of floated conductive layers are consecutively disposed between two interleaved groups of the first and second pluralities of conductive layers.

6. The capacitor of claim 5, wherein the conductive layers comprise metal material and the non-conductive layers comprise dielectric material.

7. The capacitor of claim 6, wherein the dielectric material comprises ceramic material.

8. A method, comprising:
   providing a first conductive layer having a first conductive area electrically coupled to a first terminal of a capacitor;
   providing a second conductive layer having a second conductive area electrically coupled to a second terminal of a capacitor;
   floating a conductive layer having a floated conductive area between the first and second conductive layers; and
   providing a non-conductive layer between each conductive layer,
   wherein the floated conductive area is completely disposed within an area defined by an overlap of the first and second conductive areas,
   wherein the floated conductive area is configured to provide the capacitor with a relatively high equivalent series resistance, the method further comprising:
   providing a relatively thin layer of non-conductive material on each outermost side of each outermost conductive layer.

9. The method of claim 8, wherein the relatively thin layer of non-conductive material disposed on each outermost side of each outermost conductive layer is sufficiently thin to provide the capacitor with a relatively low equivalent series inductance.

10. The method of claim 8, further comprising:
    providing a first plurality of conductive layers including the first conductive layer;
    providing a second plurality of conductive layers including the second conductive layer; and
    interleaving the first plurality of conductive layers with the second plurality of conductive layers.

11. The method of claim 10, further comprising:
    providing a plurality of floated conductive layers including the floated conductive layer.

12. The method of claim 11, further comprising:
    providing all of the plurality of floated conductive layers consecutively between two interleaved groups of the first and second pluralities of conductive layers.

13. The method of claim 12, wherein the conductive layers comprise metal material and the non-conductive layers comprise dielectric material.

14. The method of claim 13, wherein the dielectric material comprises ceramic material.

15. A system, comprising:
    a conductive signal line; and
    a capacitor coupled to the conductive signal line, wherein the capacitor comprises:
    a first conductive layer having a first conductive area electrically coupled to a first terminal;

a second conductive layer having a second conductive area electrically coupled to a second terminal;

a floated conductive layer having a floated conductive area disposed between the first and second conductive layers; and a plurality of non-conductive layers respectively disposed between each of the conductive layers, wherein the floated conductive area is completely disposed within an area defined by an overlap of the first and second conductive areas, wherein the floated conductive area is configured to provide the capacitor with a relatively high equivalent series resistance, the capacitor further comprising:

a relatively thin layer of non-conductive material disposed on each outermost side of each outermost conductive layer.

16. The system of claim 15, wherein the relatively thin layer of non-conductive material disposed on each outermost side of each outermost conductive layer is sufficiently thin to provide the capacitor with a relatively low equivalent series inductance.

17. The system of claim 15, wherein:
the first conductive layer is one layer of a first plurality of conductive layers,
the second conductive layer is one layer of a second plurality of conductive layers, and
the first plurality of conductive layers is interleaved with the second plurality of conductive layers.

18. The system of claim 17, wherein the floated conductive layer is one layer of a plurality of floated conductive layers.

19. The system of claim 18, wherein all of the plurality of floated conductive layers are consecutively disposed between two interleaved groups of the first and second pluralities of conductive layers.

20. The system of claim 19, wherein the conductive layers comprise metal material and the non-conductive layers comprise dielectric material.

21. The system of claim 20, wherein the dielectric material comprises ceramic material.

22. The system of claim 21, further comprising:
a processor coupled to the signal line.

* * * * *